(12) United States Patent
Miyamoto et al.

(10) Patent No.: US 11,463,515 B2
(45) Date of Patent: Oct. 4, 2022

(54) MANAGEMENT DEVICE AND MANAGEMENT METHOD

(71) Applicant: Nippon Telegraph and Telephone Corporation, Tokyo (JP)

(72) Inventors: Katsuma Miyamoto, Tokyo (JP); Akihiro Okada, Tokyo (JP); Hideo Tsuchiya, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 0 days.

(21) Appl. No.: 17/266,436

(22) PCT Filed: Jul. 26, 2019

(86) PCT No.: PCT/JP2019/029423
§ 371 (c)(1),
(2) Date: Feb. 5, 2021

(87) PCT Pub. No.: WO2020/031752
PCT Pub. Date: Feb. 13, 2020

(65) Prior Publication Data
US 2021/0297481 A1    Sep. 23, 2021

(30) Foreign Application Priority Data

Aug. 7, 2018  (JP) .............................. JP2018-148840

(51) Int. Cl.
*H04L 29/08* (2006.01)
*H04L 67/1036* (2022.01)
(Continued)

(52) U.S. Cl.
CPC .......... *H04L 67/1036* (2013.01); *H04L 47/82* (2013.01); *H04L 63/029* (2013.01); *H04L 63/164* (2013.01)

(58) Field of Classification Search
CPC ... H04L 67/1036; H04L 47/82; H04L 63/029; H04L 63/164
See application file for complete search history.

(56) References Cited

U.S. PATENT DOCUMENTS

2010/0318660 A1* 12/2010 Balasubramanian ... H04L 47/11
718/104
2011/0270987 A1* 11/2011 Schlansker ............. H04L 45/02
709/242

(Continued)

FOREIGN PATENT DOCUMENTS

JP        2017-147526     8/2017
WO    WO 2016/076207    5/2016

(Continued)

OTHER PUBLICATIONS

[No Author Listed], "Network Functions Virtualization (NFV); Use Cases," ETSI GS NFV 001, Oct. 2013, 50 pages.

(Continued)

*Primary Examiner* — Gil H. Lee
*Assistant Examiner* — Juan C Turriate Gastulo
(74) *Attorney, Agent, or Firm* — Fish & Richardson P.C.

(57) ABSTRACT

An acquisition unit acquires a state of a server including pieces of virtual CPE, and an instructing unit instructs CPE connected to the virtual CPE to control a communication band based on the state of the server. The instructing unit instructs the CPE to limit a communication band to a predetermined value or less based on a CPU usage rate acquired by the acquisition unit exceeding a predetermined threshold value. The instructing unit instructs the CPE to limit a communication band to a predetermined value or less in based on the number of connections of the CPE acquired by the acquisition unit being less than a predetermined threshold value. The acquisition unit acquires presence or absence of CPE not connected to the virtual CPE, and the (Continued)

instructing unit instructs the CPE to block communication based on the presence of CPE not connected to the virtual CPE.

14 Claims, 5 Drawing Sheets

(51) Int. Cl.
*H04L 47/70* (2022.01)
*H04L 9/40* (2022.01)

(56) References Cited

U.S. PATENT DOCUMENTS

| | | | | |
|---|---|---|---|---|
| 2012/0163184 A1* | 6/2012 | Choi | ................... | H04L 65/1069 |
| | | | | 370/241 |
| 2012/0278459 A1* | 11/2012 | VerSteeg | ............... | H04L 69/163 |
| | | | | 709/223 |
| 2013/0132559 A1* | 5/2013 | Kotecha | .................. | H04L 43/16 |
| | | | | 709/224 |
| 2016/0285703 A1* | 9/2016 | Joe | ...................... | H04L 41/5051 |
| 2017/0339183 A1 | 11/2017 | Hu et al. | | |
| 2019/0028329 A1* | 1/2019 | Kanakarajan | ....... | H04L 12/2856 |
| 2019/0159472 A1 | 5/2019 | David et al. | | |
| 2019/0387049 A1* | 12/2019 | Patil | .................... | G06F 9/45558 |
| 2021/0092067 A1* | 3/2021 | Monma | ................. | H04W 12/37 |
| 2021/0195446 A1* | 6/2021 | Sevindik | ............. | H04W 72/085 |

FOREIGN PATENT DOCUMENTS

| | | |
|---|---|---|
| WO | WO 2018/028764 | 2/2018 |
| WO | WO 2018/138761 | 8/2018 |

OTHER PUBLICATIONS

Rtpro.yamaha.com.jp, [online], "IPsec Overview," 2006, retrieved on Jun. 27, 2018, retrieved from URL<http://www.rtpro.yamaha.co.jp/RT/docs/ipsec/abst.html>, 7 pages (with English Translation).

Tsuchiya et al., "A proposal of allocation of security function on virtual CPE system," IEICE 2018 General Conference Lecture Proceedings Communication 2, Mar. 20, 2018, p. 87, 3 pages (with English Translation).

* cited by examiner

MANAGEMENT DEVICE AND MANAGEMENT METHOD

CROSS-REFERENCE TO RELATED APPLICATIONS

This application is a National Stage application under 35 U.S.C. § 371 of International Application No. PCT/JP2019/029423, having an International Filing Date of Jul. 26, 2019, which claims priority to Japanese Application Serial No. 2018-148840, filed on Aug. 7, 2018. The disclosure of the prior application is considered part of the disclosure of this application, and is incorporated in its entirety into this application.

TECHNICAL FIELD

The present disclosure relates to a management apparatus and a management method.

BACKGROUND ART

In the related art, a technique for aggregating functions of customer premises equipment (CPE) on a virtualisation infrastructure of a core network as virtual CPE (vCPE) is known (see Non Patent Literature 1). The virtual CPE is connected to CPE in a user's home through a tunnel in which a communication system such as an IP security architecture is implemented (IPsec, see Non Patent Literature 2).

In an IPsec, a "tunnel authentication process" is performed when communication is started, and a "packet transfer process" is performed during communication. These processes are executed by respective dedicated hardware in a router and executed by resources on a server such as a central processing unit (CPU) in a general purpose server or the like.

CITATION LIST

Non Patent Literature

Non Patent Literature 1: "ETSI GS NFV 001 V1.1.1 (2013-10) Network Functions Virtualization (NFV); Use Cases," [online], ETSI, [retrieved Jul. 11, 2018], Internet<URL: http://www.etsi.org/deliver/etsi_gs/NFV/001_099/001/01.01.01_60/gs_NFV001 v010101p.pdf>

Non Patent Literature 2: "Outline of IPsec," [online], YAMAHA Corporation, [retrieved Jul. 11, 2018], Internet<URL:http://www.rtpro.yamaha.co.jp/RT/docs/ipsec/abst.html>

SUMMARY OF THE INVENTION

Technical Problem

However, in the related art, in a case where tunnel connection requests are concentrated in a server in which a plurality of pieces of virtual CPE are implemented, tunnel establishment may be delayed. For example, at the time of restoration from a large-scale power failure, or the like, a large number of pieces of CPE simultaneously request reconnection to vCPE on the same server, and a "tunnel authentication process" is performed between the vCPE all at once in the server.

In this case, when the plurality of pieces of connected CPE communicate with each other, a processing load increases due to a "packet transfer process" in the server in which the vCPE is implemented, and the execution of a "tunnel authentication process" of other CPE requesting reconnection is delayed, which leads to a delay in tunnel establishment. Time-out occurs due to a delay in tunnel establishment, and thus it takes time to perform restoration for the entire server.

The present disclosure is conceived in view of the above-described circumstances, and an object thereof is to suppress a delay in tunnel establishment in a case where tunnel connection requests are concentrated in a server in which a plurality of pieces of virtual CPE are implemented.

Means for Solving the Problem

In order to resolve the above-described problems and achieve the object, a management apparatus according to the present disclosure includes an acquisition unit that acquires a state of a server, in which a plurality of pieces of virtual CPE are implemented, and an instructing unit that instructs CPE connected to the virtual CPE to control a communication band in accordance with the state of the server.

Effects of the Invention

According to the present disclosure, it is possible to suppress a delay in tunnel establishment even in a case where tunnel connection requests are concentrated in a server in which a plurality of pieces of virtual CPE are implemented.

DESCRIPTION OF EMBODIMENTS

Hereinafter, an embodiment of the present disclosure will be described in detail with reference to the drawings. Note that the present disclosure is not limited by the embodiment. Further, in the illustration of the drawings, the same portions are denoted by the same reference numerals and signs.

System Configuration

Figure 1:
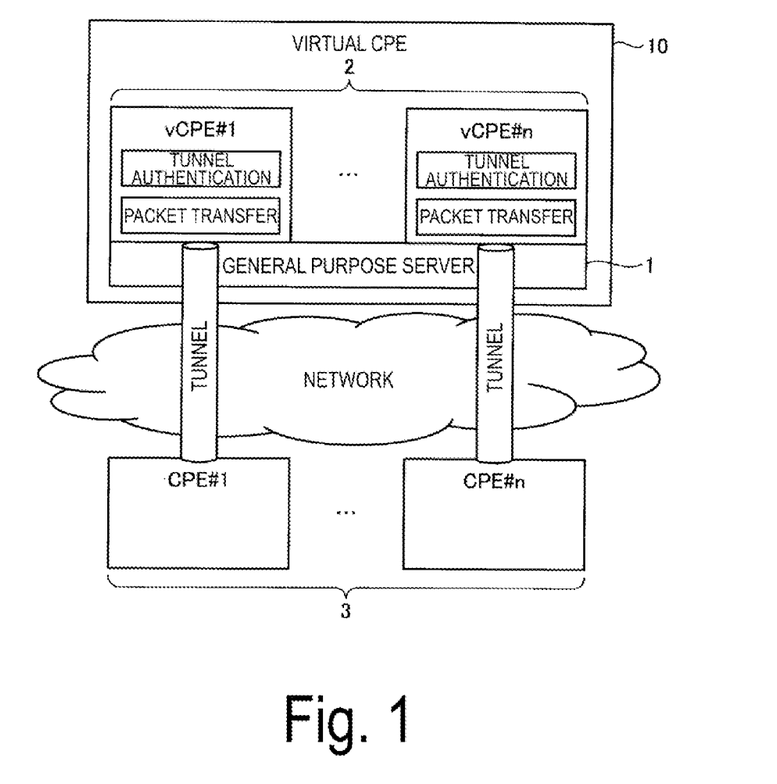
FIG. 1 is a schematic diagram illustrating a configuration of a system to be processed by a management apparatus according to the present embodiment.

First, FIG. 1 is a schematic diagram illustrating a configuration of a system to be processed by a management apparatus according to the present embodiment. As illustrated in FIG. 1, the system to be processed by the management apparatus includes a plurality of pieces of virtual CPE 2 (vCPE #1, . . . , vCPE #n) implemented on a general purpose server 1 and CPE 3 (CPE #1, . . . , CPE #n) in a user's home. The virtual CPE 2 on the general purpose server 1 is implemented such that each virtual CPE 2 corresponds to the respective CPE 3.

The CPE 3 in the user's home and the corresponding virtual CPE 2 are connected to each other by a tunnel created in a network by an IPsec or the like. In the example illustrated in FIG. 1, vCPE #1 and CPE #1 are connected to each other by a tunnel, and vCPE #n and CPE #n are connected to each other by a tunnel.

Figure 2:
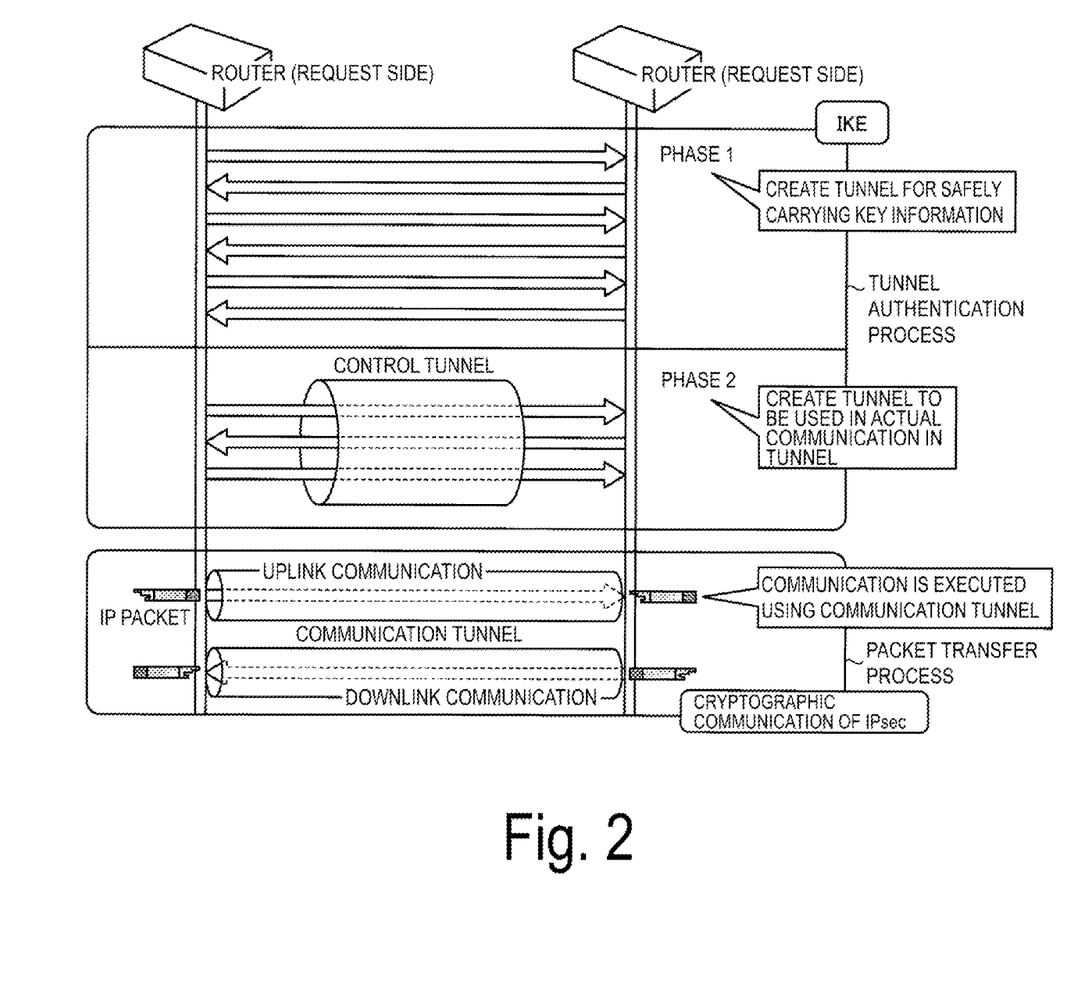
FIG. 2 is an explanatory diagram illustrating the system to be processed by the management apparatus.
Figure 3:
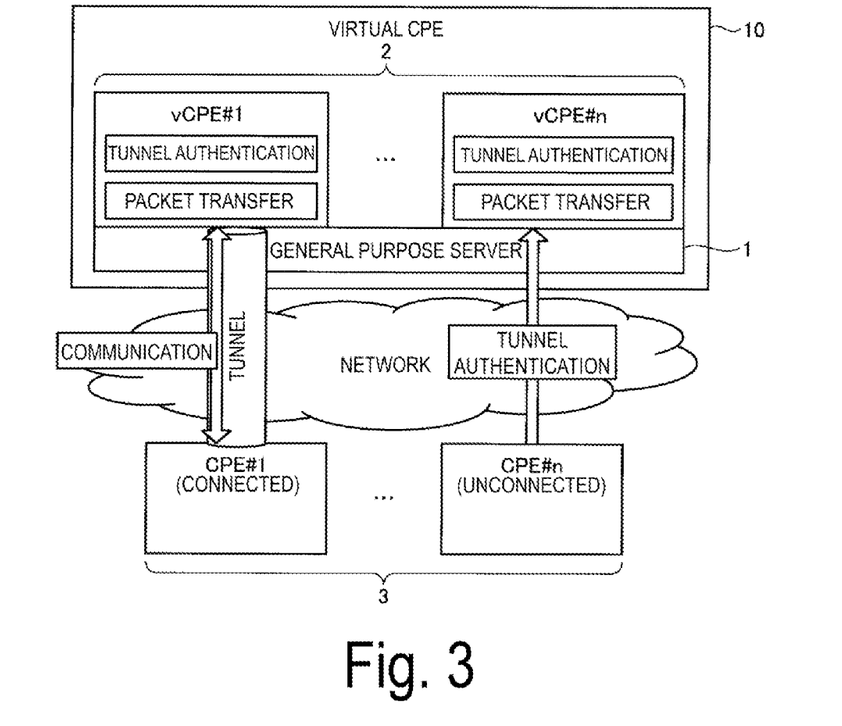
FIG. 3 is an explanatory diagram illustrating the system to be processed by the management apparatus.

Here, FIGS. 2 and 3 are explanatory diagrams illustrating a system to be processed by the management apparatus. First, as illustrated in FIG. 2, in the IPsec, communication is performed through a tunnel authentication process and a packet transfer process.

The tunnel authentication process is executed by a key exchange protocol called Internet Key Exchange (IKE). The tunnel authentication process includes a phase 1 for creating a control tunnel for safely carrying key information used for IPsec communication and a phase 2 for creating a communication tunnel used for communication within the control tunnel.

Further, in the packet transfer process, communication is performed using the communication tunnel created in the tunnel authentication process. The communication tunnel is a tunnel in which two tunnels for uplink communication and for downlink communication are paired. Further, in the IPsec communication, cryptographic communication using a key exchanged in the tunnel authentication process is performed.

In addition, as illustrated in FIG. 3, the general purpose server 1 having the plurality of pieces of virtual CPE 2 implemented therein performs the tunnel authentication process on the CPE 3, (CPE #n) which is not connected to the virtual CPE 2, and connects the CPE 3 by the tunnel, thereby making the CPE 3 to be in a communicably connected state. Furthermore, the general purpose server 1 communicates with the CPE 3 (CPE #1), which has been connected through the tunnel authentication process, by a packet transfer process.

The management apparatus 10 is installed on the general purpose server 1 in which the plurality of pieces of virtual CPE 2 are implemented. However, the present disclosure is not limited to a case where the virtual CPE 2 is installed on the general purpose server 1, and it may be mounted on, for example, different hardware which is configured to be communicable with the general purpose server 1.

The management apparatus 10 executes management processing, which is described below, for example, in a case where the plurality of pieces of CPE 3 are disconnected simultaneously, in a case where the plurality of pieces of CPE 3 simultaneously request tunnel connection, or manually by an operator's determination. Specifically, the management apparatus 10 instructs the connected CPE 3 to control a communication band according to the state of the general purpose server 1. Thereby, the management apparatus 10 dynamically limits the band of the packet transfer process with the connected CPE 3 (CPE #1) in accordance with the state of the general purpose server 1, and makes it possible to preferentially perform the tunnel authentication process for unconnected CPE 3 (CPE #n).

Configuration of Management Apparatus

Figure 4:
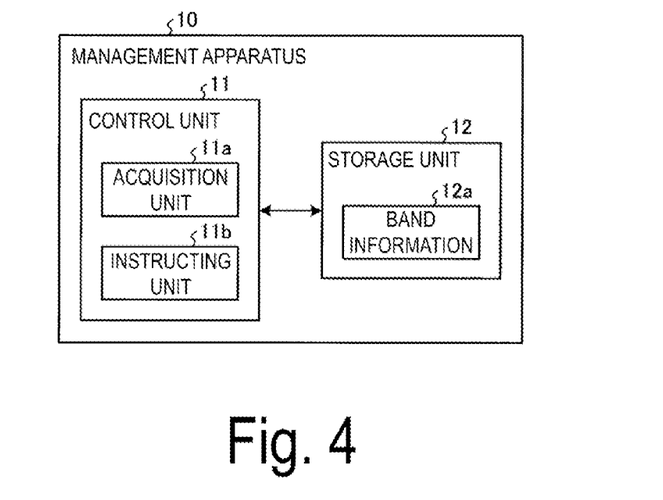
FIG. 4 is a schematic diagram illustrating a schematic configuration of the management apparatus.

Next, FIG. 4 is a schematic diagram illustrating a schematic configuration of the management apparatus of the present embodiment. As illustrated in FIG. 4, the management apparatus 10 according to the present embodiment is realized using a central processing unit (CPU), a field programmable gate array (FPGA), or the like and functions as a control unit 11 by executing a processing program stored in a memory. In addition, the management apparatus 10 includes a storage unit 12 which is realized using a semiconductor memory device such as a RAM or a flash memory.

The storage unit 12 stores band information 12*a*. The band information 12*a* is information in which the state of the general purpose server 1 and the communication band are associated with each other, and an instructing unit 11*b* refers to the band information in management processing, which is described below. The band information 12*a* is stored in advance in the storage unit 12 through an input unit such as a keyboard that is not illustrated in the drawing.

As illustrated in FIG. 4, the control unit 11 functions as an acquisition unit 11*a* and the instructing unit 11*b*. Note that these functional units may be installed on different pieces of hardware.

The acquisition unit 11*a* acquires the state of the general purpose server 1 in which the plurality of pieces of virtual CPE 2 are implemented. For example, the acquisition unit 11*a* acquires, as the state of the general purpose server 1, a CPU usage rate of the general purpose server 1, the amount of traffic, the number of connections of the CPE 3 connected to the virtual CPE 2 implemented in the general purpose server 1, the presence or absence of CPE 3 which is not connected to the virtual CPE 2 implemented in the general purpose server 1, and the like.

The instructing unit 11*b* instructs the CPE 3 connected to the virtual CPE 2 to control the communication band in accordance with the state of the general purpose server 1. Specifically, the instructing unit 11*b* compares the state of the general purpose server 1 acquired by the acquisition unit 11*a* with the band information 12*a*, and instructs the virtual CPE 2 and the CPE 3 connected to the virtual CPE 2 to control the communication band (band control).

Figure 5:
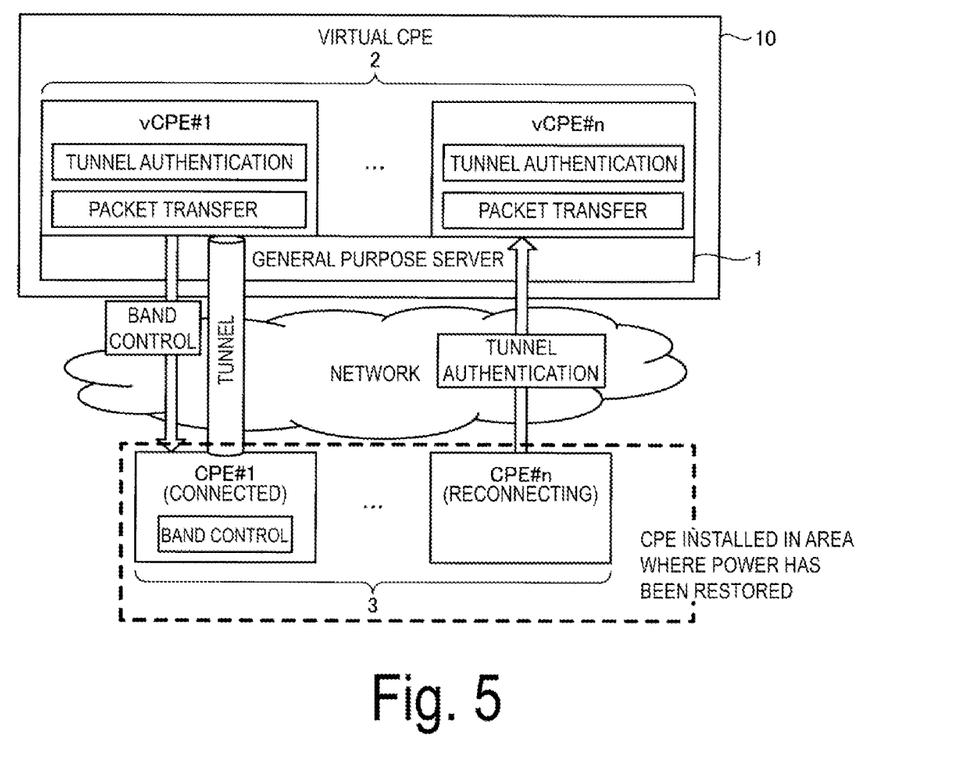
FIG. 5 is an explanatory diagram illustrating processing of the management apparatus.

Here, FIG. 5 is an explanatory diagram illustrating processing of the management apparatus. FIG. 5 illustrates a case where, when a large-scale power failure has occurred, a large number of pieces of CPE 3 (CPE #1, . . . , CPE #n) installed in an area where power has been restored have simultaneously requested reconnection to virtual CPE 2 (vCPE #1, . . . , vCPE #n) of the same general purpose server 1.

In the management apparatus 10, for example, when the acquisition unit 11*a* acquires a CPU usage rate of the general purpose server 1, the instructing unit 11*b* instructs virtual CPE 2 (vCPE #1) and CPE 3 (CPE #1) connected to the virtual CPE 2 to limit the communication band to a predetermined value or less in a case where the CPU usage rate of the general purpose server 1 exceeds a predetermined threshold value.

In this case, in the band information 12*a*, for example, the CPU usage rate is classified into a plurality of stages, and a predetermined value for the communication band is configured differently for each stage of the CPU usage rate, where the predetermined value of the communication band becomes smaller as the CPU usage rate becomes higher. The instructing unit 11*b* notifies the virtual CPE 2 (vCPE #1) and CPE 3 (CPE #1) connected to the virtual CPE 2 of the predetermined value of the communication band corresponding to the CPU usage rate acquired by the acquisition unit 11*a*, with reference to the band information 12*a*.

In a case where band control is instructed, CPE 3 (CPE #1) in a user's home limits a communication band of an uplink packet to an instructed predetermined value. In addition, the virtual CPE 2 (vCPE #1) limits the communication band of a downlink packet to the instructed predetermined value.

Thereby, in the general purpose server 1, in a case where the CPU usage rate is high, the "packet transfer process" between the general purpose server 1 and the connected CPE 3 is limited. For this reason, the "tunnel authentication process" between the general purpose server 1 and the unconnected CPE 3 can be preferentially performed. Thus, time-out due to a delay in tunnel establishment can be suppressed, and thus restoration from a power failure happens sooner in the entire general purpose server 1.

Note that, as the state of the general purpose server 1, the amount of traffic of the general purpose server 1 may be used instead of the CPU usage rate of the general purpose server 1. That is, the acquisition unit 11*a* acquires the amount of traffic of the general purpose server 1 as the state of the general purpose server 1, and the instructing unit 11*b* instructs the CPE connected to the virtual CPE to limit the communication band to a predetermined value or less in a case where the amount of traffic exceeds a predetermined threshold value. In this case, in the band information 12*a*, for example, the amount of traffic is classified into a plurality of stages, and a predetermined value for the communication band is configured differently for each stage of the amount of traffic, where the predetermined value of the communication band becomes smaller as the amount of traffic increases.

In addition, when the acquisition unit 11*a* acquires the number of pieces of the CPE 3 connected to the virtual CPE 2 implemented in the general purpose server 1 (the number of connections), the instructing unit 11*b* instructs the CPE 3 (CPE #1) connected to the virtual CPE 2 to limit a communication band to a predetermined value or less in a case where the number of connections is less than a predetermined threshold value.

In this case, in the band information 12*a*, for example, the number of connections is classified into a plurality of stages, and the predetermined value for the communication band is configured differently for each stage of the number of connections, where the predetermined value of the communication band becomes smaller as the number of connections decreases. The instructing unit 11*b* notifies the CPE 3 (CPE #1) connected to the virtual CPE 2 (vCPE #1) of the predetermined value of the communication band corresponding to the number of connections acquired by the acquisition unit 11*a*, with reference to the band information 12*a*. Thereby, in the general purpose server 1, in a case where the number of connections of the CPE 3 is small, the "packet transfer process" between the general purpose server 1 and the connected CPE 3 is limited, and the "tunnel authentication process" between the general purpose server 1 and unconnected CPE 3 can be preferentially performed.

In addition, when the acquisition unit 11*a* acquires the presence or absence of the CPE 3 which is not connected to the virtual CPE 2 implemented in the general purpose server 1, the instructing unit 11*b* instructs the CPE 3 (CPE #1) connected to the virtual CPE 2 to block communication of a communication type other than a predetermined communication type in a case where there is CPE 3 which is not connected to the virtual CPE 2.

That is, for example, while there is the CPE 3 (CPE #n) being in the process of reconnecting due to restoration of power, the instructing unit 11*b* allows only communication of a specific communication type such as VoIP and blocks communication of other communication types for the connected CPE 3 (CPE #1). In addition, the instructing unit 11*b* allows communication of all communication types when the tunnel authentication processes of all the CPE 3 have been completed and power has been restored.

In this case, in the band information 12*a*, for example, communication bands of communication other than the specific communication type are set to 0. In a case where the acquisition unit 11*a* has acquired information indicating that there is CPE 3 which is not connected to the virtual CPE 2, the instructing unit 11*b* notifies the virtual CPE 2 (vCPE #1) and the connected CPE 3 (CPE #1) of a communication type of which communication is allowed and an instruction for setting communication bands of other communication types to 0, with reference to the band information 12*a*. Thereby, in the general purpose server 1, in a case where there is unconnected CPE 3, communication of communication types other than the specific communication type are blocked, so that the "tunnel authentication process" between the general purpose server 1 and the unconnected CPE 3 can be preferentially performed.

Management Processing

Figure 6:
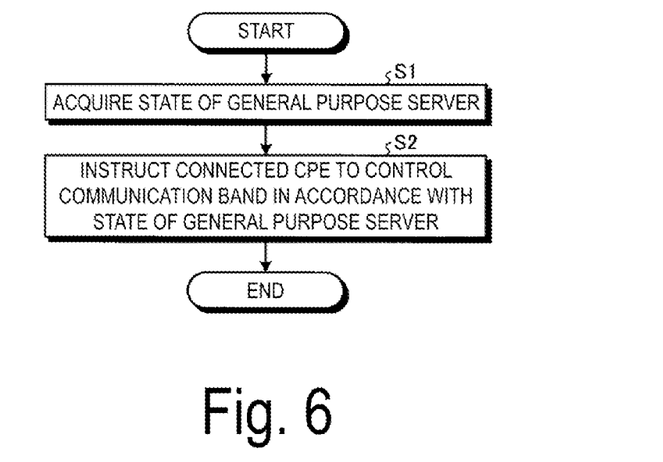
FIG. 6 is a flowchart illustrating a management processing procedure.

Next, FIG. 6 is a flowchart illustrating a management processing procedure. The flowchart illustrated in FIG. 6 is started, for example, periodically at a predetermined interval or at a timing instructed by an operator.

First, the acquisition unit 11*a* acquires the state of the general purpose server 1 in which the plurality of pieces of virtual CPE 2 are implemented (step S1). For example, the acquisition unit 11*a* acquires the CPU usage rate of the general purpose server 1, the amount of traffic, the number of connections of CPE 3 in a user's home which are connected to the virtual CPE 2 implemented in the general purpose server 1, the presence or absence of CPE 3 which is not connected to the virtual CPE 2 implemented in the general purpose server 1, or the like.

Next, the instructing unit 11*b* instructs the CPE 3 connected to the virtual CPE 2 to control the communication band in accordance with the state of the general purpose server 1 (step S2). Specifically, the instructing unit 11*b* compares the state of the general purpose server 1 acquired by the acquisition unit 11*a* with the band information 12*a*, and instructs the virtual CPE 2 and the CPE 3 connected to the virtual CPE 2 to perform the band control.

For example, in a case where the CPU usage rate of the general purpose server 1 exceeds a predetermined threshold value, the instructing unit 11*b* instructs the virtual CPE 2 and the CPE 3 connected to the virtual CPE 2 to limit the communication band to a predetermined value or less.

Alternatively, in a case where the amount of traffic of the general purpose server 1 exceeds a predetermined threshold value, the instructing unit 11*b* instructs the CPE connected to the virtual CPE to limit a communication band to a predetermined value or less.

Alternatively, in a case where the number of connections of the CPE 3 connected to the virtual CPE 2 implemented in the general purpose server 1 is less than a predetermined threshold value, the instructing unit 11*b* instructs the CPE 3 connected to the virtual CPE 2 to limit a communication band to a predetermined value or less.

Alternatively, in a case where there is CPE 3 which is not connected to the virtual CPE 2, the instructing unit 11*b* instructs the CPE 3 connected to the virtual CPE 2 to block communication of a communication type other than a predetermined communication type.

The CPE 3 in a user's home, which is instructed to perform the band control, limits the communication band of an uplink packet to the instructed predetermined value. In addition, the virtual CPE 2 (vCPE #1) limits the communication band of a downlink packet to the instructed predetermined value. This ends the series of management processing.

As described above, in the management apparatus 10 of the present embodiment, the acquisition unit 11a acquires the state of the general purpose server 1 in which the plurality of pieces of virtual CPE 2 are implemented. In addition, the instructing unit 11b instructs the CPE 3 connected to the virtual CPE 2 to control the communication band in accordance with the state of the general purpose server 1.

Thereby, the packet transfer process between the general purpose server 1 and the connected CPE 3 is dynamically limited in accordance with the state of the general purpose server 1, and the tunnel authentication process for unconnected CPE 3 can be preferentially performed. For example, in a case where the general purpose server 1, in which a plurality of pieces of virtual CPE are implemented, is congested with the tunnel connection requests, the "tunnel authentication process" can be preferentially performed over a "packet transfer process." Thus, time-out due to a delay in the tunnel establishment can be suppressed, and thus for example, the entire general purpose server 1 can be promptly restored from a large-scale power failure.

In addition, when the acquisition unit 11a acquires the CPU usage rate of the general purpose server 1 as the state of the general purpose server 1, the instructing unit 11b instructs the CPE 3 connected to the virtual CPE 2 to limit the communication band to a predetermined value or less in a case where the CPU usage rate exceeds a predetermined threshold value, with reference to the band information 12a. Thereby, in the general purpose server 1, in a case where the CPU usage rate is high, the "packet transfer process" between the general purpose server 1 and the connected CPE 3 is limited, and the "tunnel authentication process" between the general purpose server 1 and unconnected CPE 3 can be preferentially performed.

In addition, when the acquisition unit 11a acquires the number of connections of CPE 3 connected to the virtual CPE 2 implemented in the general purpose server 1 as the state of the general purpose server 1, the instructing unit 11b instructs the CPE 3 connected to the virtual CPE 2 to limit the communication band to a predetermined value or less in a case where the number of connections is less than a predetermined threshold value. Thereby, in the general purpose server 1, in a case where the number of connections of CPE 3 is small, the "packet transfer process" between the general purpose server 1 and the connected CPE 3 is limited, and the "tunnel authentication process" between the general purpose server 1 and unconnected CPE can be preferentially performed.

In addition, when the acquisition unit 11a acquires the presence or absence of CPE 3 which is not connected to the virtual CPE 2 implemented in the general purpose server 1 as the state of the general purpose server 1, the instructing unit 11b instructs the CPE 3 connected to the virtual CPE 2 to block communication of a communication type other than a predetermined communication type in a case where there is CPE 3 which is not connected to the virtual CPE 2. Thereby, in the general purpose server 1, in a case where there is unconnected CPE 3, communication not of a specific communication type is blocked, and the "tunnel authentication process" between the general purpose server 1 and the unconnected CPE 3 can be preferentially performed.

Program

It is also possible to create a program in which processing executed by the management apparatus 10 according to the embodiment described above is described in a computer-executable language. As one embodiment, the management apparatus 10 can install and implement a management program for executing the management processing described above in a desired computer as packaged software or on-line software. For example, an information processing apparatus can be configured to function as the management apparatus 10 by causing the information processing apparatus to execute the management program described above. The information processing apparatus described here includes a desktop or laptop personal computer. In addition, a mobile communication terminal such as a smart phone or a mobile phone, a slate terminal such as a personal digital assistant (PDA), and the like are included in the category of the information processing apparatus. In addition, the functions of the management apparatus 10 may be mounted in a cloud server.

Figure 7:
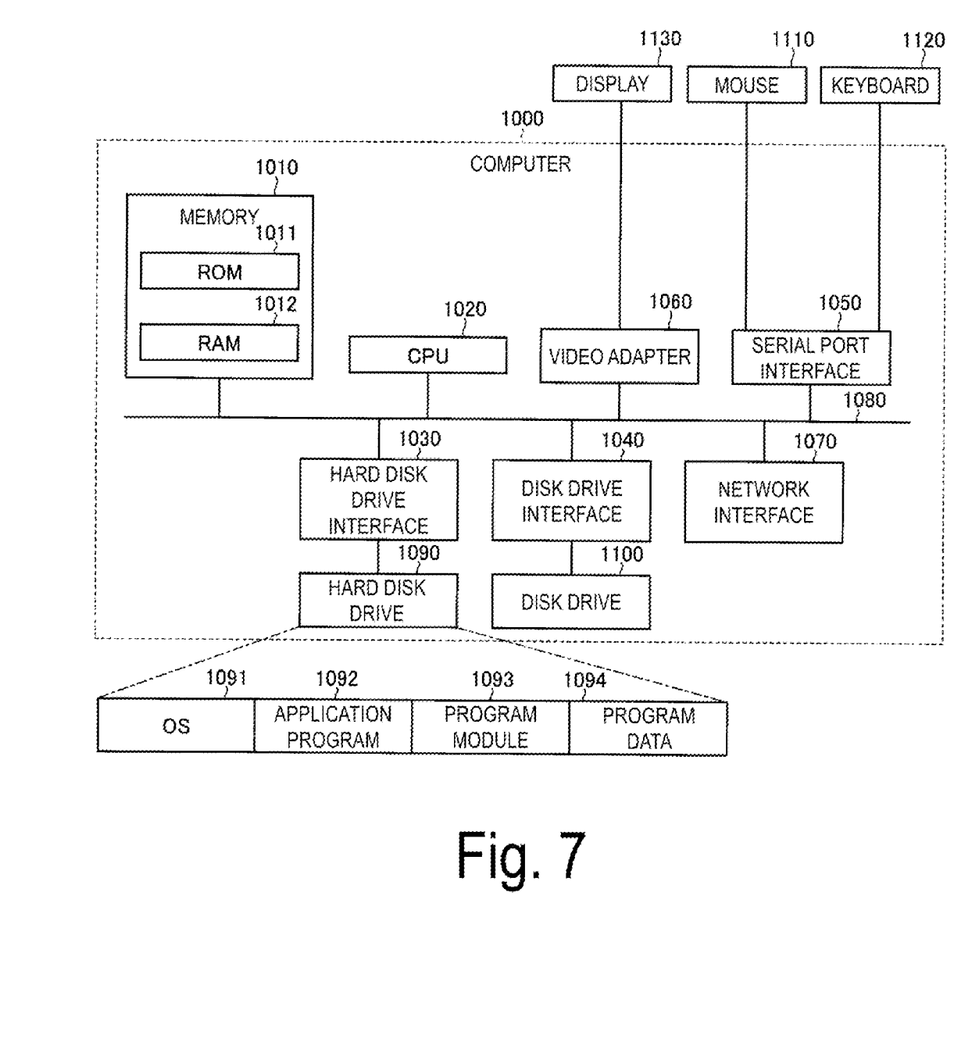
FIG. 7 is a diagram illustrating an example of a computer that executes a management program.

FIG. 7 is a diagram illustrating an example of a computer that executes a management program. A computer 1000 has, for example, a memory 1010, a CPU 1020, a hard disk drive interface 1030, a disk drive interface 1040, a serial port interface 1050, a video adapter 1060, and a network interface 1070. These units are connected to each other by a bus 1080.

The memory 1010 includes a read only memory (ROM) 1011 and a RAM 1012. The ROM 1011 stores a boot program such as a basic input output system (BIOS). The hard disk drive interface 1030 is connected to a hard disk drive 1031. The disk drive interface 1040 is connected to a disk drive 1041. A removable storage medium such as a magnetic disk or an optical disc may be mounted on the disk drive 1041. For example, a mouse 1051 and a keyboard 1052 are connected to the serial port interface 1050. For example, a display 1061 is connected to the video adapter 1060.

Here, the hard disk drive 1031 stores, for example, an OS 1091, an application program 1092, a program module 1093, and program data 1094. The information described in the above-described embodiment is stored in, for example, the hard disk drive 1031 and the memory 1010.

In addition, for example, the management program is stored in the hard disk drive 1031 as the program module 1093 in which commands to be executed by the computer 1000 are described. Specifically, the hard disk drive 1031 stores the program module 1093 in which the processes are described, each process being described in the embodiment and executed by the management apparatus 10.

In addition, data used in information processing according to the management program is stored in, for example, the hard disk drive 1031 as the program data 1094. Then, the CPU 1020 reads out the program module 1093 and the program data 1094 stored in the hard disk drive 1031 to the RAM 1012 as needed and executes the above-described procedures.

Note that the program module 1093 and the program data 1094 related to the management program are not necessarily stored in the hard disk drive 1031 and, for example, may be stored in the removable storage medium and read by the CPU 1020 through the disk drive 1041 or the like. Alternatively, the program module 1093 and the program data 1094 related to the management program may be stored in another computer connected through the network such as a local area network (LAN) or a wide area network (WAN) and read by the CPU 1020 through the network interface 1070.

Although the embodiment to which the invention made by the inventor is applied has been described above, the present disclosure is not limited by the description and the drawings as a part of the disclosure of the present disclosure according to the embodiment. That is, other embodiments, examples, operation techniques, and the like made by those skilled in the art on the basis of the present embodiment are all included in the scope of the present disclosure.

REFERENCE SIGNS LIST

1 General purpose server
2 Virtual CPE
3 CPE
10 Management apparatus
11 Control unit
11a Acquisition unit
11b Instructing unit
12 Storage unit
12a Band information

The invention claimed is:

1. A management apparatus comprising:
an acquisition unit, including one or more processors, configured to acquire a state of a server in which a plurality of pieces of virtual customer premises equipment (CPE) are implemented; and
an instructing unit, including one or more processors, configured to instruct CPE connected to the virtual CPE to control a communication band in accordance with the state of the server,
wherein the acquisition unit is configured to acquire a CPU usage rate of the server from the state of the server,
wherein the instructing unit is configured to instruct the CPE connected to the virtual CPE to limit the communication band to a first predetermined value or less based on the CPU usage rate exceeding a first predetermined threshold value,
wherein the CPU usage rate is classified into a plurality of stages, and
wherein the first predetermined value of the communication band is configured differently for different stages among the plurality of stages of the CPU usage rate.

2. The management apparatus according to claim 1, wherein:
the acquisition unit is configured to acquire a number of connections of the CPE connected to the virtual CPE implemented in the server from the state of the server, and
the instructing unit is configured to instruct the CPE connected to the virtual CPE to limit the communication band to a second predetermined value or less based on the number of connections being less than a second predetermined threshold value.

3. The management apparatus according to claim 1, wherein:
the acquisition unit is configured to acquire presence or absence of CPE which is not connected to the virtual CPE implemented in the server from the state of the server, and
the instructing unit is configured to instruct the CPE connected to the virtual CPE to block communication of a communication type other than a predetermined communication type based on there being CPE, which is not connected to the virtual CPE.

4. A management method executed by a management apparatus, the management method comprising:
acquiring a state of a server in which a plurality of pieces of virtual CPE are implemented;
instructing CPE connected to the virtual CPE to control a communication band in accordance with the state of the server;
acquiring a CPU usage rate of the server from the state of the server; and
instructing the CPE connected to the virtual CPE to limit the communication band to a first predetermined value or less based on the CPU usage rate exceeding a first predetermined threshold value,
wherein the CPU usage rate is classified into a plurality of stages, and
wherein the first predetermined value of the communication band is configured based on the plurality of stages of the CPU usage rate.

5. The management method according to claim 4, further comprising:
acquiring a number of connections of the CPE connected to the virtual CPE implemented in the server from the state of the server; and
instructing the CPE connected to the virtual CPE to limit the communication band to a second predetermined value or less based on the number of connections being less than a second predetermined threshold value.

6. The management method according to claim 4, further comprising:
acquiring presence or absence of CPE which is not connected to the virtual CPE implemented in the server from the state of the server, and
instructing the CPE connected to the virtual CPE to block communication of a communication type other than a predetermined communication type based on there being CPE, which is not connected to the virtual CPE.

7. The management apparatus according to claim 1, wherein the first predetermined value decreases based on the CPU usage rate increasing.

8. The management apparatus according to claim 7, wherein the instructing unit is configured to notify, to the virtual CPE and the CPE connected to the virtual CPE, the first predetermined value.

9. The management apparatus according to claim 2, wherein the second predetermined value decreases based on the number of connections of the CPE connected to the virtual CPE decreasing.

10. The management apparatus according to claim 9, wherein the instructing unit is configured to notify, to the virtual CPE and the CPE connected to the virtual CPE, the second predetermined value.

11. The management apparatus according to claim 1, wherein:
the acquisition unit is configured to acquire an amount of traffic of the server from the state of the server, and
the instructing unit is configured to instruct the CPE connected to the virtual CPE to limit the communication band to a third predetermined value or less based on the amount of traffic exceeding a third predetermined threshold value.

12. The management apparatus according to claim 11, wherein the instructing unit is configured to notify, to the virtual CPE and the CPE connected to the virtual CPE, the third predetermined value.

13. The management method according to claim 4, further comprising:
acquiring an amount of traffic of the server from the state of the server; and
instructing the CPE connected to the virtual CPE to limit the communication band to a third predetermined value or less based on the amount of traffic exceeding a third predetermined threshold value.

14. The management method according to claim 13, further comprising notifying, to the virtual CPE and the CPE connected to the virtual CPE, the third predetermined value.

\* \* \* \* \*